United States Patent [19]
Kobayashi et al.

[11] Patent Number: 5,385,454
[45] Date of Patent: Jan. 31, 1995

[54] BEARING DEVICE FOR USE IN A CANNED MOTOR

[75] Inventors: Makoto Kobayashi; Masakazu Yamamoto; Yoshio Miyake; Yoshikazu Kimura, all of Kanagawa, Japan

[73] Assignee: Ebara Corporation, Tokyo, Japan

[21] Appl. No.: 45,694

[22] Filed: Apr. 14, 1993

[30] Foreign Application Priority Data

| Apr. 14, 1992 | [JP] | Japan | 4-120182 |
| Apr. 14, 1992 | [JP] | Japan | 4-120183 |
| Jun. 5, 1992 | [JP] | Japan | 4-171684 |
| Jun. 5, 1992 | [JP] | Japan | 4-171689 |
| Jun. 5, 1992 | [JP] | Japan | 4-171691 |

[51] Int. Cl.6 .................................. F04B 17/00
[52] U.S. Cl. ..................... 417/423.12; 415/229
[58] Field of Search ............. 417/423.7, 423.1, 423.15, 417/423.12, 366, 368, 365, 357, 360; 415/229; 389/220, 906, 222, 295

[56] References Cited

U.S. PATENT DOCUMENTS

| 2,030,193 | 2/1936 | Arnold | 384/215 |
| 2,080,683 | 5/1937 | Yost et al. | 384/220 |
| 2,406,947 | 9/1946 | Harlamoff | 417/423.11 |
| 2,868,133 | 1/1959 | Clark | 417/423.11 |
| 2,875,694 | 3/1959 | Carter | 417/357 |
| 3,220,350 | 11/1965 | White | 417/365 |
| 3,885,767 | 5/1975 | Olowinski et al. | 384/222 |
| 3,918,852 | 11/1975 | Carter | 417/365 |
| 3,999,897 | 12/1976 | Staub | 417/365 |
| 4,234,293 | 11/1980 | Lichtle | 417/365 |
| 4,297,246 | 1/1981 | Abe et al. | 415/229 |
| 4,363,608 | 12/1982 | Mulders | 417/423.12 |
| 4,427,337 | 1/1984 | Dickinson | 415/229 |
| 4,545,741 | 10/1985 | Tomioka et al. | 417/365 |
| 4,880,362 | 11/1989 | Laing et al. | 417/365 |
| 4,904,166 | 2/1990 | Wasemann | 417/423.11 |
| 4,948,348 | 8/1990 | Doll et al. | 417/365 |
| 5,009,578 | 4/1991 | Hyland | 417/365 |
| 5,129,795 | 7/1992 | Hyland | 417/423.12 |
| 5,160,246 | 11/1992 | Horiuchi | 415/229 |
| 5,207,512 | 5/1993 | Grant et al. | 384/906 |
| 5,232,342 | 8/1993 | Thompson | 384/906 |

Primary Examiner—Richard A. Bertsch
Assistant Examiner—Peter Korytnyk
Attorney, Agent, or Firm—Oblon, Spivak, McClelland, Maier & Neustadt

[57] ABSTRACT

A bearing device for use in a canned motor includes a bearing housing detachably mounted on a motor frame of the canned motor, and a radial bearing supported by the bearing housing. A pair of axially spaced stationary thrust sliding surfaces is mounted on the bearing housing, and a pair of axially spaced rotating thrust sliding surfaces are mounted on the rotor in confronting relationship to the stationary thrust sliding surfaces, respectively. A resilient member such as an O-ring is interposed between the motor frame and the bearing housing for holding the bearing housing in radial position with respect to the motor frame.

26 Claims, 12 Drawing Sheets

Fig. 3(a)
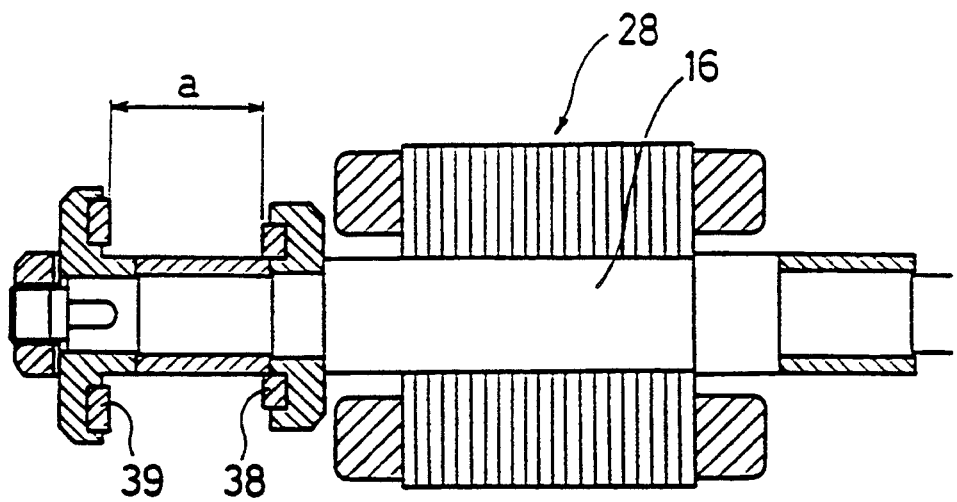
Fig. 3(b)
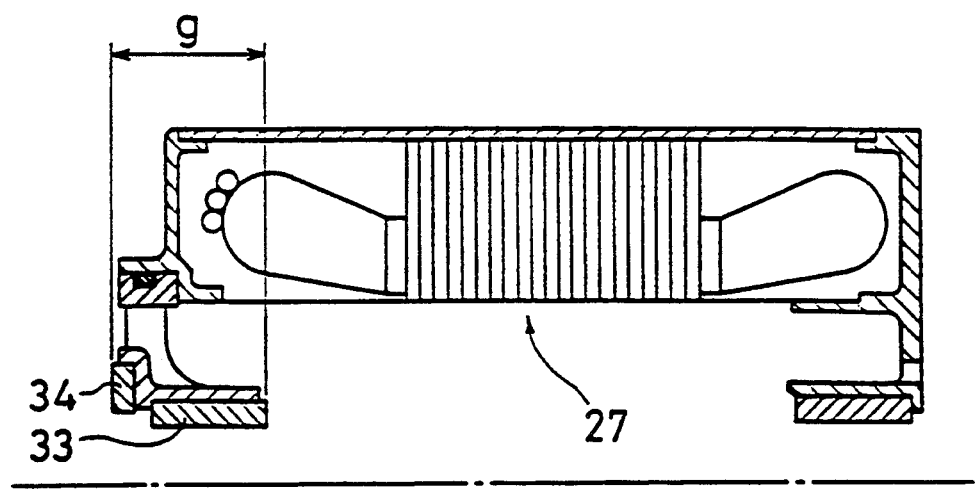
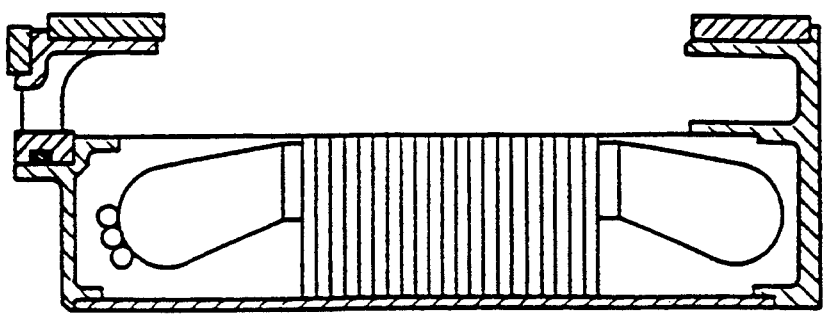

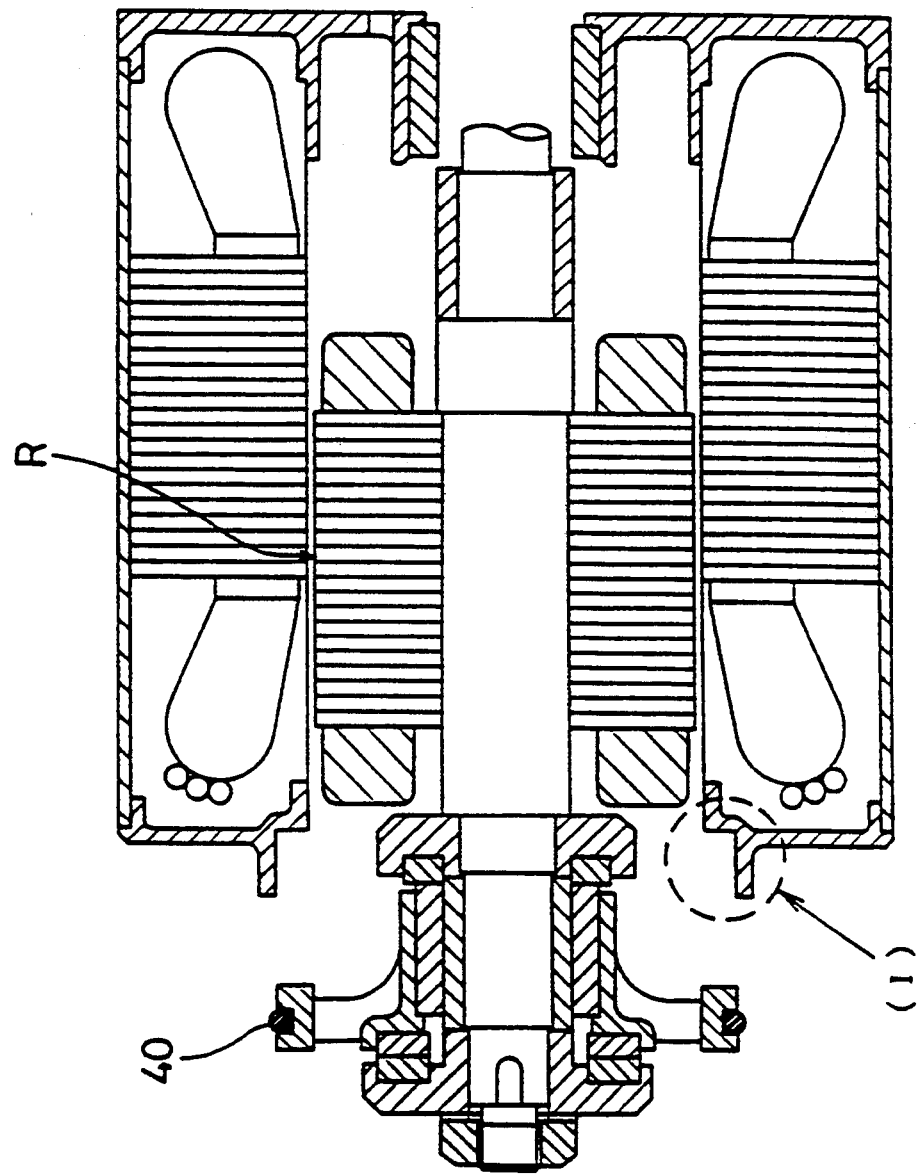

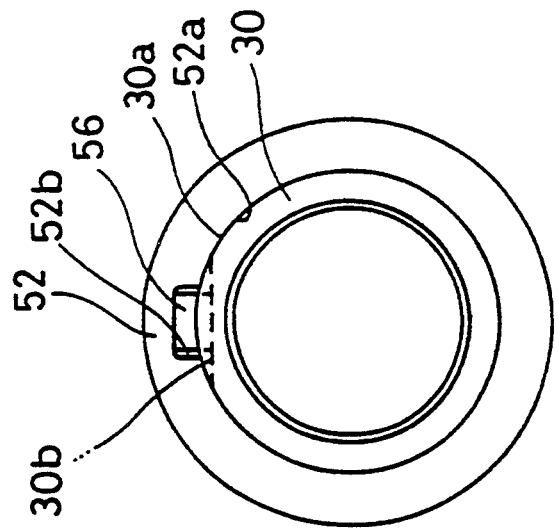
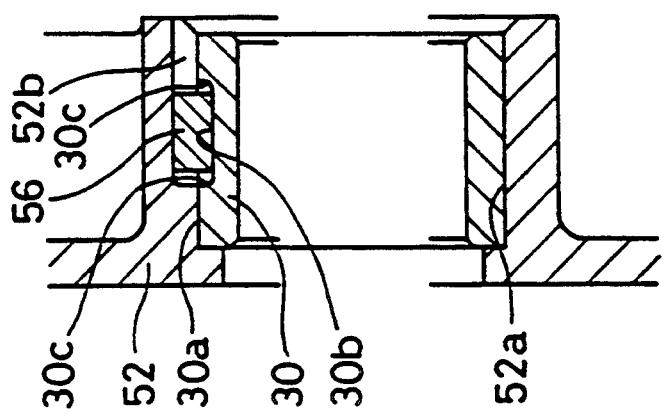

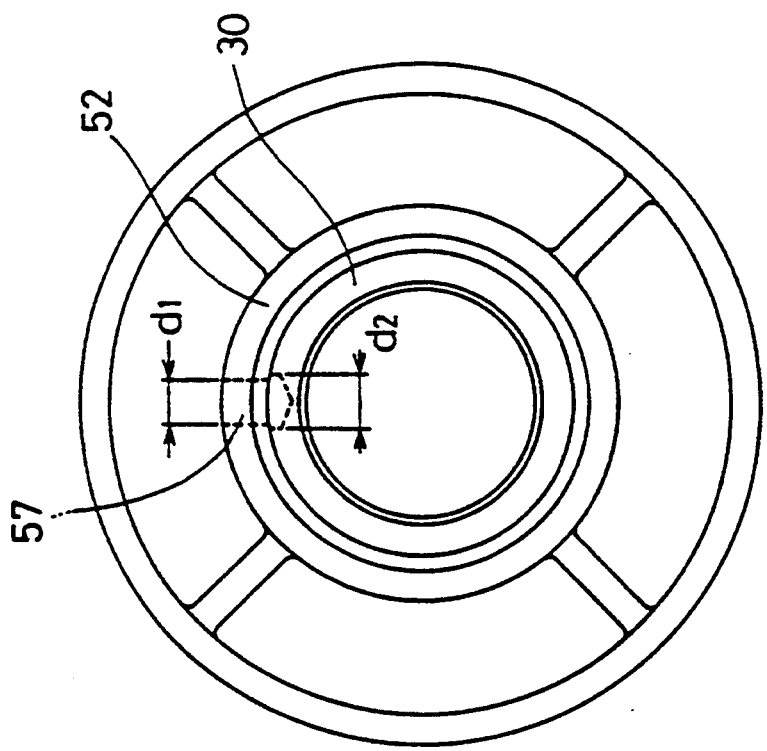
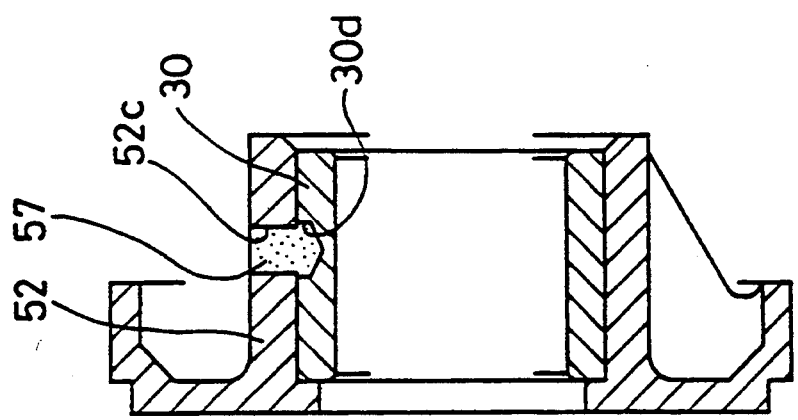

BEARING DEVICE FOR USE IN A CANNED MOTOR

BACKGROUND OF THE INVENTION

1. Field of the Invention

The present invention relates to a bearing device for use in a canned motor, and more particularly to a bearing device comprising a cartridge-type bearing for use in a canned motor, and a canned motor equipped with such a bearing device.

2. Description of the Related Art

A canned-motor pump has a pump casing for housing a canned motor therein. In general, a canned-motor pump circulates some of the fluid being pumped to lubricate the bearings of the canned motor and also cool the canned motor. The bearings of the canned-motor generally include two radial bearings of plain metal for supporting a motor rotor at its opposite ends and two thrust bearings of plain metal for bearing thrust loads applied to both side ends in opposite axial directions. It is important that these bearings be highly accurate both individually and relatively to each other, i.e., with respect to mutual concentricity, perpendicularity to the motor axis, axial end play, and other factors. To meet such accuracy requirements, it is necessary for the bearings to be structured and shaped for easily achieving a desired level of accuracy, so that the bearings can be machined and assembled with accuracy.

One conventional bearing device assembled in a canned motor will be described below with reference to FIGS. 12, 13(a) and 13(b) of the accompanying drawings.

As shown in FIG. 12, a canned motor has a rotor 60 rotatably supported by radial bearings 62, 63 on both ends thereof. The rotor 60 has a shaft 61 on which thrust disks 64, 65 are fixedly mounted at both ends, respectively. Thrust bearings 66, 67 are fixed to respective axially outer surfaces of the respective thrust discs 64, 65. The canned motor also has a motor frame 68 to which a thrust bearing 69 is fixed near the output side end, the thrust bearing 66 being rotatable with respect to, and disposed in axially confronting relationship to, the thrust bearing 69. The radial bearing 63 is supported in a bearing housing 70 that is fastened to the motor frame 68 near the other end. The thrust bearing 67 is rotatable with respect to, and disposed in axially confronting relationship to, the radial bearing 63. The motor frame 68 and other parts fixedly coupled thereto serve as a motor stator.

The canned motor is incorporated in a pump for delivering a liquid. If such a liquid contains a slurry, the clearance between the sliding surfaces of each of the radial bearings 62, 63 should be small to prevent the slurry from entering the radial bearings 62, 63. The smaller the clearance between the sliding surfaces of each of the radial bearings 62, 63, the higher the pressure between those sliding surfaces, making it more difficult for the slurry to find its way into the radial bearings 62, 63. To achieve a desired accuracy of the clearance between the radial bearing surfaces, it is necessary that the concentricity of the radial bearings 62, 63 be highly accurate. However, since the desired concentricity requires precision machining of both side ends of the motor frame 68 the cost of the canned motor is relatively high.

If the axial end play of the thrust bearings 66, 67, 69 is too large, the slurry tends to enter the thrust bearings 66, 67, 69 while the pump is not in operation, and the thrust bearings 66, 67, 69 are liable to be damaged due to shocks that may occur during shipment. Consequently, the thrust bearings 66, 67, 69 are required to have an optimum axial end play.

To obtain such an optimum axial end play in the thrust bearings 66, 67, 69, the canned motor is required to accurately define a dimension A (see FIG. 13(a)), i.e., the distance between the axially outer surfaces of the rotatable thrust bearings 66, 67, and a dimension G (see FIG. 13(b)), i.e., the distance between the axially inner surfaces of the stationary thrust bearing 69 and the radial bearing 63. To accurately define the dimension A, it is then necessary to accurately define the dimensions of a plurality of parts that are involved in determining the dimension A as shown in FIG. 13(a). Similarly, to accurately define the dimension G, it is then necessary to accurately define the dimensions of a plurality of parts that are involved in determining the dimension G as shown in FIG. 13(b).

The shaft 61, which is a relatively large part of the rotor, cannot easily be machined because its large dimension has to be defined with the same accuracy as the other parts.

Likewise, the stator, which is also a relatively large part of the motor, cannot easily be machined because its large dimension has to be defined with the same accuracy as the other parts and also because the stator itself requires a high machining finish.

In addition, since the thrust bearings 66, 67, 69 are positioned on the opposite ends of the shaft 61, the actual axial end play in those thrust bearings 66, 67, 69 can be determined only after the rotor is actually assembled in the stator. In the event that the actual axial end play is found to be inappropriate, the rotor has to be disassembled from the stator, the thrust bearings 66, 67, 69 and other parts have to be machined or adjusted, and the rotor has to be assembled in the stator again. Such disassembling, adjusting, and reassembling processes have to be repeated until the proper axial end play is achieved.

SUMMARY OF THE INVENTION

It is an object of the present invention to provide a bearing device for use in a canned motor, which is easily capable of achieving a desired axial end play between thrust bearing sliding surfaces, and of eliminating errors in concentricity and perpendicularity of both side bearing parts and also dimensional errors of interfitting parts in a socket-and-spigot joint.

According to the present invention, there is provided a bearing device in a canned motor having a motor frame and a rotor rotatable with respect to the motor frame, the rotor having a shaft, comprising a bearing housing detachably mounted on the motor frame; a radial bearing supported by the bearing housing, the shaft being rotatably supported by the radial bearing; a pair of axially spaced stationary thrust sliding surfaces on the bearing housing; a pair of axially spaced rotating thrust sliding surfaces on the rotor in confronting relationship to the stationary thrust sliding surfaces, respectively; and a resilient member interposed between the motor frame and the bearing housing for resiliently holding the bearing housing in radial position with respect to the motor frame.

According to the present invention, there is also provided a canned motor comprising at motor frame housing a stator; a rotor rotatably supported by the motor frame and including a shaft having a pair of axially opposite end portions; and a bearing device disposed on one of the axially opposite end portions of the shaft, the bearing device comprising a bearing housing detachably mounted on the motor frame; a radial bearing supported by the bearing housing, the shaft being rotatably supported by the radial bearing; a pair of axially spaced stationary thrust sliding surfaces on the bearing housing; a pair of axially spaced rotating thrust sliding surfaces on the rotor in confronting relationship to the stationary thrust sliding surfaces, respectively; and a resilient member interposed between the motor frame and the bearing housing for resiliently holding the bearing housing in radial position with respect to the motor frame.

BRIEF DESCRIPTION OF THE DRAWINGS

The above and other objects, features, and advantages of the present invention will become apparent from the following description when taken in conjunction with the accompanying drawings which illustrate preferred embodiments of the present invention by way of example:

FIG. 3(a) is an axial cross-sectional view of parts of the bearing device which are mounted on a motor rotor;

FIG. 3(b) is an axial cross-sectional view of parts of the bearing device which are mounted on a motor stator;

FIG. 4 is an axial cross-sectional view showing the manner in which the bearing device is assembled;

FIG. 7(a) is a cross-sectional view of a radial bearing device incorporated in the full-circumferential flow in-line pump in FIGS. 1 and 5;

FIG. 7(b) is a side view of a radial bearing device incorporated in the full-circumferential flow in-line pump in FIGS. 1 and 5;

FIG. 9(a) is a cross-sectional view of a radial bearing device incorporated in the full-circumferential flow in-line pump in FIGS. 1 and 5;

FIG. 9(b) is a side view of a radial bearing device incorporated in the full-circumferential flow in-line pump in FIGS. 1 and 5;

DETAILED DESCRIPTION OF THE PREFERRED EMBODIMENTS

Figure 1:
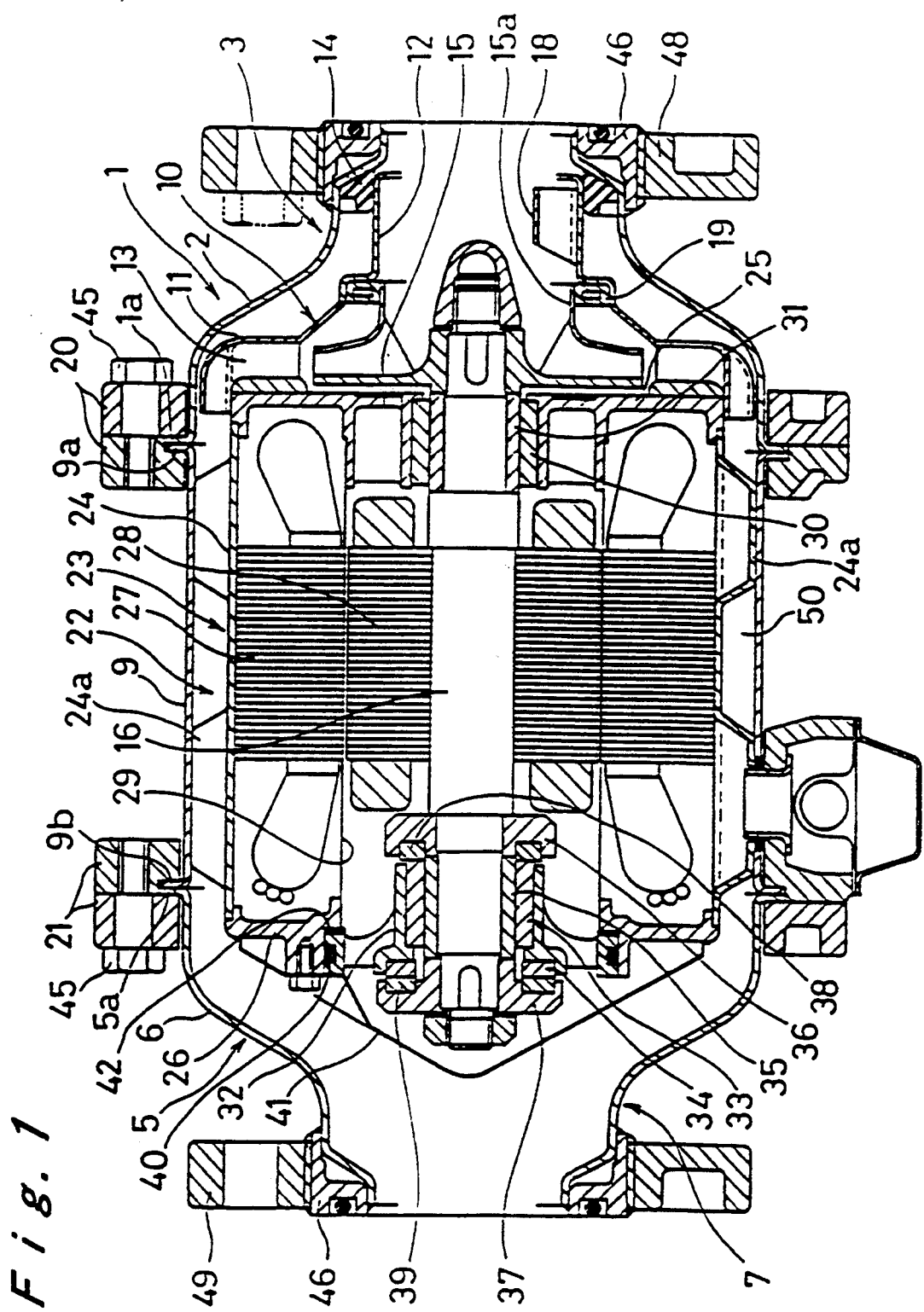
FIG. 1 is an axial cross-sectional view of a full-circumferential flow in-line pump having a canned motor which incorporates a bearing device according to an embodiment of the present invention.

FIG. 1 shows in cross section a full-circumferential flow in-line pump having a canned motor which incorporates a bearing device according to an embodiment of the present invention. As shown in FIG. 1, the in-line pump generally comprises a suction-side casing 1, a discharge-side casing 5, and an outer cylinder 9 interconnecting the suction-side casing 1 and the discharge-side casing 5. The suction-side casing 1, the discharge-side casing 5, and the outer cylinder 9 are in the form of sheets such as stainless steel pressed to shape by deep drawing. The suction-side casing 1, the discharge-side casing 5, and the outer cylinder 9 have respective flanges 1a, 5a, 9a, 9b extending radially outwardly from open ends thereof. The adjacent flanges 1a, 9a of the suction-side casing 1 and the outer cylinder 9 are clamped by flanges 20 in the form of castings such as iron castings, and securely fastened to each other by bolts 45 which join the flanges 20. Similarly, the adjacent flanges 5a, 9b of the discharge-side casing 5 and the outer cylinder 9 are clamped by flanges 21 in the form of castings such as iron castings, and securely fastened to each other by bolts 45 which join the flanges 21. Each of the flanges 20, 21 is composed of two separable flange members. The suction-side casing 1, the discharge-side casing 5, and the outer cylinder 9 jointly serve as a pump casing, which houses a canned motor 22.

The suction-side casing 1 comprises a frustoconical body 2 and a cylindrical suction nozzle 3 extending axially into a suction region from the frustoconical body 2. Similarly, the discharge-side casing 5 comprises a frustoconical body 6 and a cylindrical discharge nozzle 7 extending axially into a discharge region from the frustoconical body 6. The suction-side casing 5 and the discharge-side casing 6 are identical in dimension and shape to each other. The suction nozzle 3 and the discharge nozzle 7 define respective suction and discharge ports that are positioned axially in line with each other.

The full-circumferential flow in-line pump also has an inner casing 10 disposed radially inwardly of the suction-side casing 1. The inner casing 10 comprises a cup-shaped body 11 and a cylindrical suction portion 12 extending axially from the cup-shaped body 11 into the suction region. A guide device 13, which defines guide vanes or a volute, is mounted on a radially inner surface of the cup-shaped body 11 of the inner casing 10. The guide device 13 is fitted over a motor frame 23 of the canned motor 22 in a socket-and-spigot joint. The motor frame 23 of the canned motor 22 is of a highly rigid structure and the guide device 13 is supported on the motor frame 23 of the canned motor 22. As a result, the inner casing 10 is supported by the highly rigid motor frame 23 of the canned motor 22. The suction portion 12 of the inner casing 10 has an axial end extending into the suction nozzle 3 near its outer end. A resilient seal 14 is disposed in an annular gap defined between the end of the suction portion 12 and the suction nozzle 3 to seal a suction side (low-pressure side) in the pump from a discharge side (high-pressure side) in the pump.

The full-circumferential flow in-line pump also has an impeller 15 rotatably disposed in the inner casing 10. The impeller 15 is coupled to and supported by a free axial end of a shaft 16 coupled to the canned motor 22. A rotation prevention plate 18 is welded or otherwise secured at its outer edges to a radially inner surface of the suction portion 12. A liner ring 19 is disposed between adjacent portions of the body 11 and the suction portion 12, with a slight clearance defined between the liner ring 19 and a suction-side axial end 15a of the impeller 15. Suction and discharge flanges 48, 49 are fixed respectively to the suction nozzle 3 and the discharge nozzle 7 through respective intermediate rings 46.

The motor frame 23 comprises a substantially cylindrical outer barrel 24 and a pair of axially spaced side plates 25, 26 attached to respective axially opposite ends of the outer barrel 24 in covering relationship to respective openings defined in the axially opposite ends of the outer barrel 24. The outer barrel 24 has a plurality of ribs 24a projecting radially outwardly from an outer circumferential surface thereof. The ribs 24a are integrally formed with the outer barrel 24 by embossing, and have outer surfaces fitted in and spot-welded or otherwise joined to the outer cylinder 9 of the pump casing.

The canned motor 22 has a stator 27 and a rotor 28 that are disposed in the motor frame 23. The rotor 28 is supported on the shaft 16 and disposed radially inwardly of the stator 27. A cylindrical can 29 is fitted in the stator 27, which is fixedly positioned in the motor frame 23, to seal the stator. A shaft sleeve 31 fitted over an end portion of the shaft 16 is rotatably supported by a radial bearing 30 that is mounted centrally in the side plate 25.

A bearing housing 32 is detachably fastened to the side plate 26 with a resilient O-ring 40 being interposed between the bearing housing 32 and the side plate 26. The bearing housing 32 and the side plate 26 are joined to each other by a socket-and-spigot joint with a clearance fit with the O-ring 40 disposed therein. The outside diameter of the bearing housing 32 is larger than the inside diameter of the can 29. The bearing housing 32 is prevented from rotating with respect to the side plate 26 by frictional forces that the O-ring 40 exerts on the side plate 26 in contact therewith. The bearing housing 32 is also prevented from being axially dislodged from the side plate 26 by a holder plate 41 fixed to the side plate 26. The bearing housing 32 holds a radial bearing 33 on its radially inner surface and a stationary thrust bearing 34 on its axially outer surface. A shaft sleeve 35 fitted over an opposite end portion of the shaft 16 is rotatably supported by the radial bearing 33.

Two thrust disks 36, 37 are fixedly mounted on the opposite end portion, i.e., a discharge-side end portion, of the shaft 16 to axially sandwich the bearing housing 32. The thrust disk 36 holds a thrust bearing 38 rotatable with and facing an axially inner end surface of the radial bearing 33 which provides a stationary thrust sliding surface. The thrust disk 37 holds a thrust bearing 39 rotatable with the shaft 16 and facing an axially outer end surface of the stationary thrust bearing 34.

Figure 2:
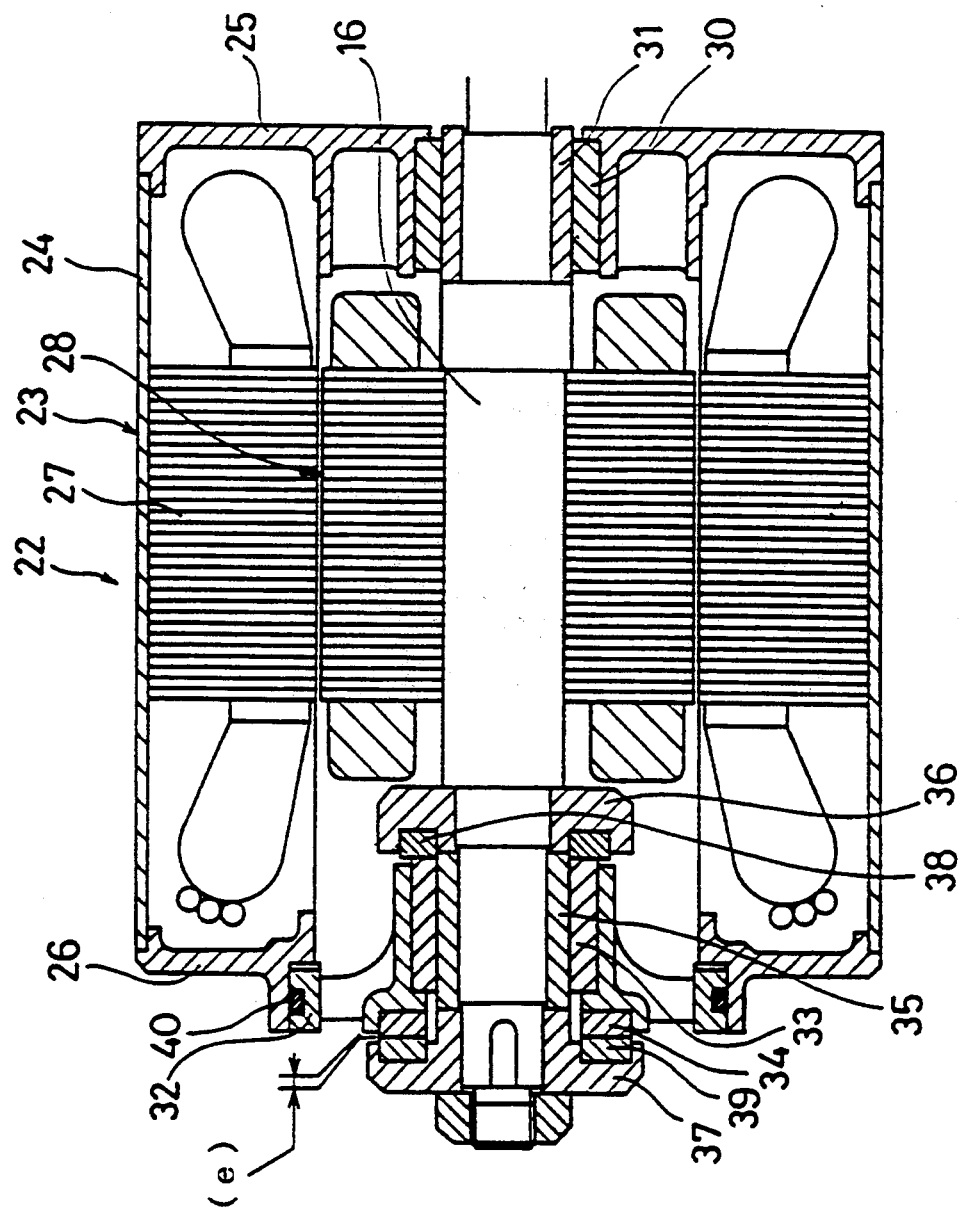
FIG. 2 is an axial cross-sectional view of the bearing device shown in FIG. 1.

In order for the thrust bearing assembly to have an optimum axial end play (e) (see FIG. 2) between the thrust bearings 34, 39, it is only necessary to define a dimension (a) (see FIG. 3(a)), i.e., the distance between the axially confronting surfaces of the thrust bearings 38, 39, and a dimension (g) (see FIG. 3(b)), i.e., the distance between the axially outer surface of the thrust bearing 34 and the axially inner surface of the radial bearing 33.

In this embodiment, the shaft 16, that is, a relatively large part, is not required to be as dimensionally accurate as the conventional canned motor shaft. Since all the parts that need desired dimensional accuracy are relatively small in size, the dimension (a) can easily be defined. The stator has a small number of parts that are required to be dimensionally accurate as desired, and is not required to be highly dimensionally accurate in the axial direction. Consequently, the axial end play (e) can easily be defined and maintained.

In this embodiment, it is possible to assemble a rotating assembly R as shown in FIG. 4. Specifically, simply by assembling relatively small parts on one side, most of the parts of the bearings are assembled into a cartridge structure which can be inserted into the stator in a socket-and-spigot joint (I) with the O-ring 40 interposed therebetween. Since the bearing parts form a cartridge structure, the axial end play (e) can easily be adjusted before they are inserted into the stator. Because the axial end play (e) can easily be adjusted, it may be greatly reduced or almost eliminated for preventing the bearings from being damaged due to shocks during shipment and also preventing foreign matter from finding its way to the sliding surfaces of the bearings. Since the bearing housing 32 is fixed in radial position by the O-ring 40 disposed in the socket-and-spigot joint (I), the O-ring 40 can absorb or eliminate errors in concentricity and perpendicularity of portions positioned at both side ends of the shaft 16 and supporting radial bearings and also dimensional errors of interfitting parts in the socket-and-spigot joint (I). Consequently, the parts in the socket-and-spigot joint (I) and the bearing housing 32 are not required to be highly dimensionally accurate.

Figure 5:
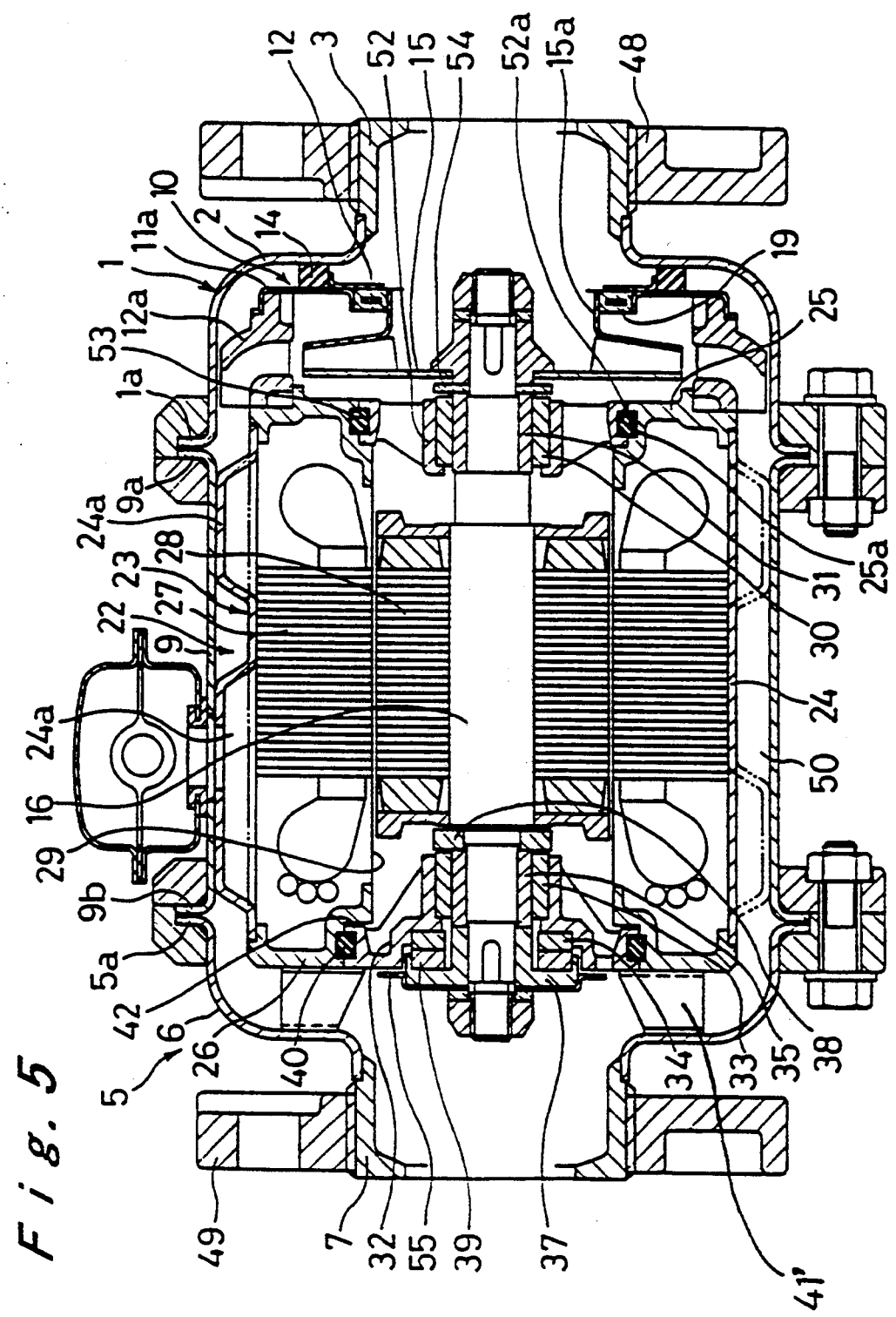
FIG. 5 is an axial cross-sectional view of a full-circumferential flow in-line pump having a canned motor which incorporates a bearing device according to another embodiment of the present invention.

FIG. 5 shows a full-circumferential flow in-line pump having a canned motor which incorporates a bearing device according to another embodiment of the present invention. Those parts shown in FIG. 5 which are identical to those shown in FIG. 1 are denoted by identical reference characters, and will not be described in detail below.

In the embodiment shown in FIG. 5, the bearing device on one side (left) is essentially similar as the bearing device on the one side (left) as shown in FIG. 1. However, the canned motor has a different bearing device on the other side. Specifically, a bearing housing 52 is detachably joined to the side plate 25 in a socket-and-spigot joint with a resilient O-ring 53 being interposed between the bearing housing 52 and the side plate 25. The bearing housing 52 and the side plate 25 have grooves 52a, 25a defined respectively in radially outer and inner surfaces thereof which confront each other. The O-ring 53 is received in these grooves 52a, 25a. The bearing housing 52 is prevented from being axially dislodged from the side plate 25 by the O-ring 53. The bearing housing 52 holds the radial bearing 30 on its radially inner surface.

The bearing housing 52 is also prevented from being axially detached from the side plate 52 by a collar 54 fixedly mounted on the shaft 16.

On the other hand, the bearing housing 32 is prevented from being axially dislodged from the side plate 26 by a holder plate 41' fixed to the discharge-side casing 5.

In this embodiment, the bearing housings 32, 52 disposed respectively on the opposite end portions of the shaft 16 are floatingly supported by the respective side plates 25, 26. Therefore, errors in concentricity and perpendicularity of both sides bearing parts and also dimensional errors of interfitting parts in the socket-and-spigot joint can be eliminated more effectively than in the previous embodiment.

In FIG. 5, the inner casing 10 comprises a partition 11a on the suction side and a guide device 12a. A cover plate 55 is mounted on the non-load-side end of the shaft 16 for preventing a slurry from entering the bearing device.

In the above embodiments, the radial bearing 33 and the stationary thrust bearing 34 provide stationary thrust sliding surfaces. However, the stationary thrust bearing 34 may be dispensed with, and the radial bearing 33 may be axially extended such that an axial and surface thereof is held in sliding contact with the rotating thrust bearing 39.

Next, the holder plate 41 in FIG. 1 will be described in detail with reference to FIG. 6(a) and 6(b).

Figure 6A:
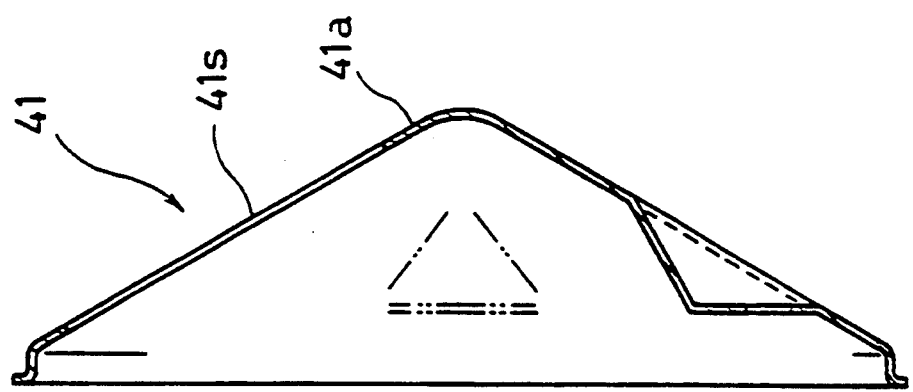
FIG. 6(a) is a cross-sectional view of a holder plate incorporated in the full-circumferential flow in-line pump in FIG. 1.
Figure 6B:
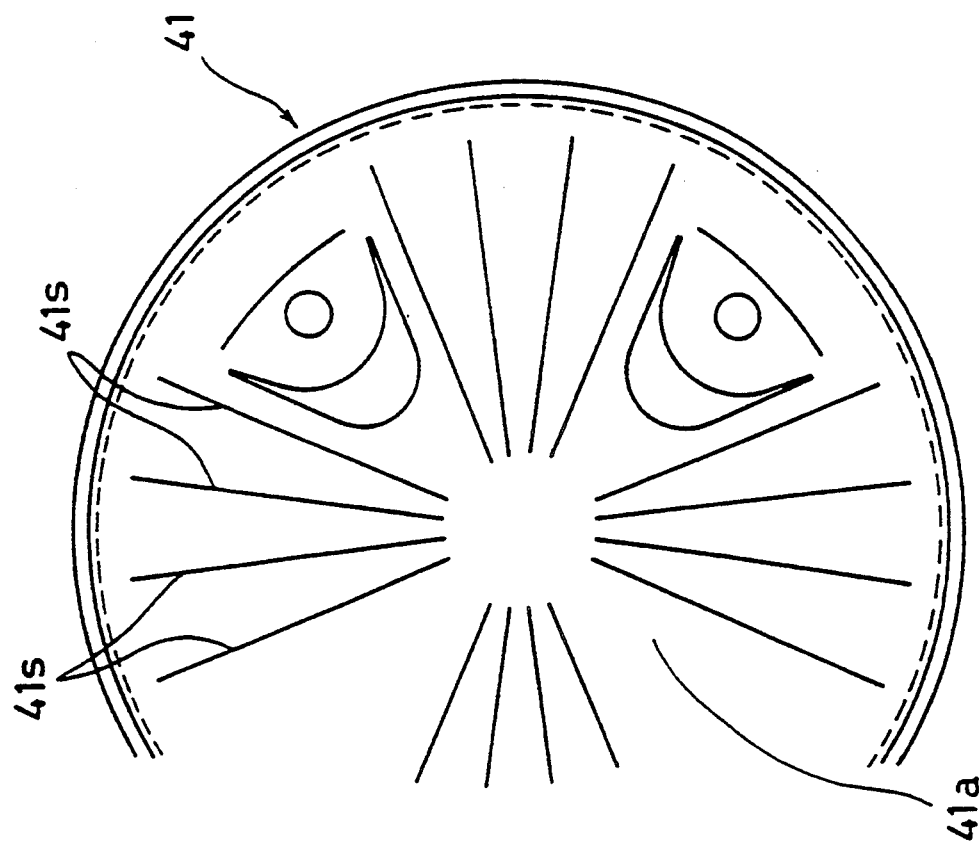
FIG. 6(b) is a side view of a holder plate incorporated in the full-circumferential flow in-line pump in FIG. 1.

As shown in FIG. 6(a), the holder plate 41 has a substantially conical guide surface 41a projecting toward a discharge port of the discharge-side pump casing 5 so as to guide fluid from the annular fluid passage 50 toward the discharge port of the discharge-side casing 5. The conical guide surface 41a has a plurality of slits 41s extending from a radially outward end to a radially inward end so that fluid is introduced into the canned motor 22.

The slits 41s are radially formed on the conical guide surface 41a and have small slit width so as to serve as a filter. When a fluid flows through the slits 41s into the canned motor 22, foreign matter in the fluid is removed by the slits 41s. Since the slits 41s are conical so as to be parallel to a direction of fluid flow, foreign matter caught by the slits 41s is removed by being pushed in the direction of fluid flow, thus preventing the slits 41s from being clogged. That is, the slits 41s have a self-cleaning function due to their shape.

Next, a radial bearing device shown in FIG. 5, with a mechanism for preventing the radial bearing from rotating, will be described in detail with reference to FIGS. 7(a) and 7(b) and FIG. 8.

Figure 8:
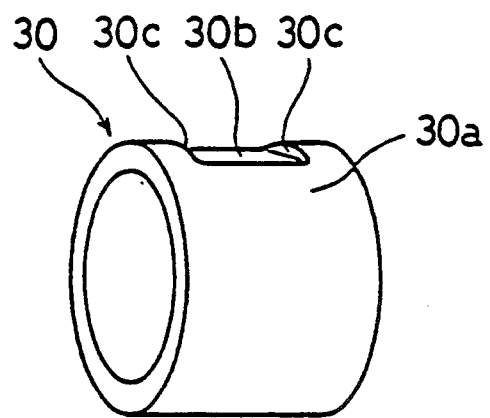
FIG. 8 is a perspective view of a radial bearing in FIGS. 7(a) and 7(b)

As shown in FIGS. 7(a), 7(b) and 8, the radial bearing 30 has an outer circumferential surface 30a on which a recess 30b is formed in a direction perpendicular to an axis of the radial bearing 30. The bearing housing 52 has an inner circumferential surface 52a in which a groove 52b is formed in parallel to an axis of the radial bearing 30. A key 56 made of resilient material such as rubber is interposed between the recess 30b and the groove 52b to prevent the radial bearing 30 from rotating. Side walls 30c, 30c positioned on both sides of the recess 30b are engaged with the key 56 to prevent the key 56 from being removed.

According to the above radial bearing device, impulse force applied to the radial bearing 30 at the time of starting rotation of the main shaft 16 can be absorbed by this resilient key 56 to thus protect the radial bearing 30 which is made of a ceramic such as silicon carbide (SiC), which is weak against impulse forces.

Since the key 56 is made of resilient material, dimensional accuracy of the radial bearing 30 is not required, and machining of the radial bearing 30 is not required after sintering.

FIGS. 9(a) and 9(b) show a radial bearing device with a mechanism for preventing the radial bearing from rotating according to another embodiment of the present invention.

As shown in FIGS. 9(a) and 9(b), the bearing housing 52 has a through hole 52c in a direction perpendicular to an axis thereof. The radial bearing 30 has a hole 30d, in a direction perpendicular to an axis thereof. The hole 30d does not pierce through the bearing body and is formed at the position corresponding to the through hole 52c. Resin 57 is injected in the through hole 52c and the hole 30d and solidified, whereby the radial bearing 30 is prevented from rotating with respect to the bearing housing 52.

An inner diameter $d_1$ of the through hole 52c is smaller than an inner diameter $d_2$ of the hole 30d, thus the resin 57 is prevented from being radially dislodged from the bearing housing 52.

Figure 10:
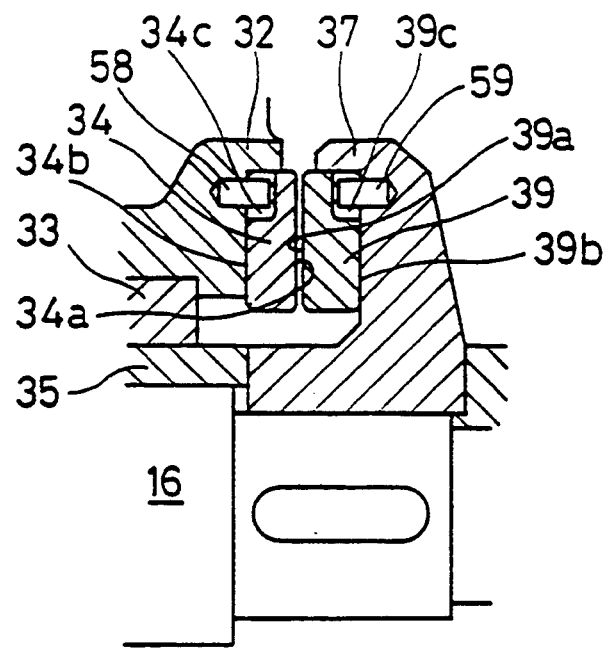
FIG. 10 is a cross-sectional view of a thrust bearing device incorporated in the full-circumferential flow in-line pump in FIGS. 1 and 5.
Figures 11A, 11B:
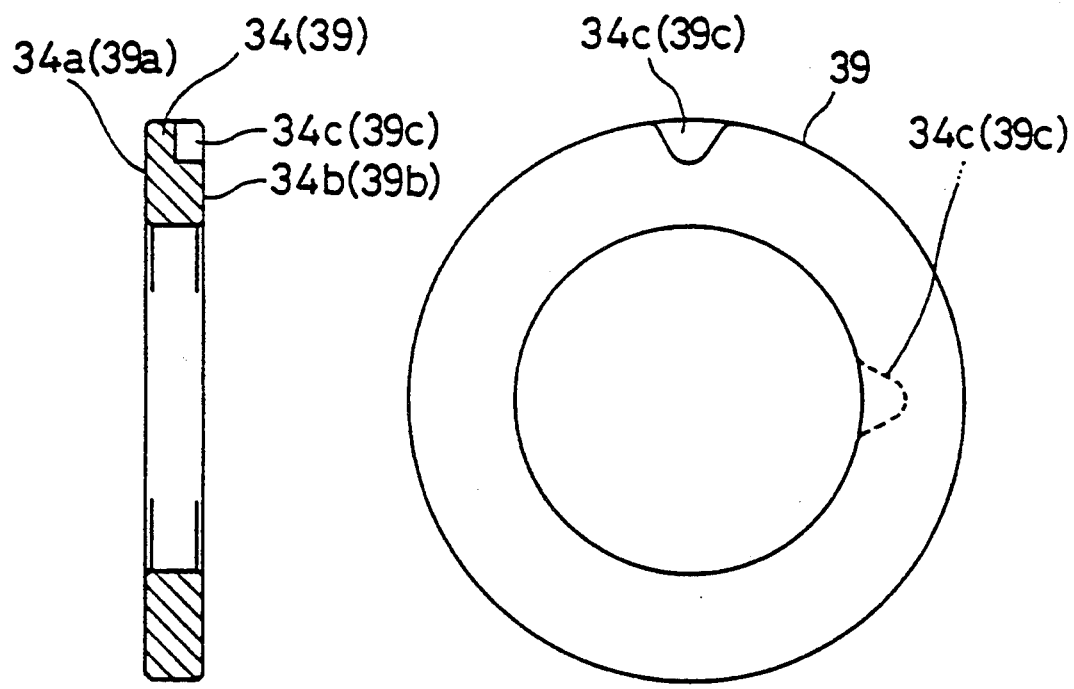
FIG. 11(a) is a cross-sectional view of a thrust bearing in FIG. 10.
FIG. 11(b) is a side view of a thrust bearing in FIG. 10.
Figure 12:
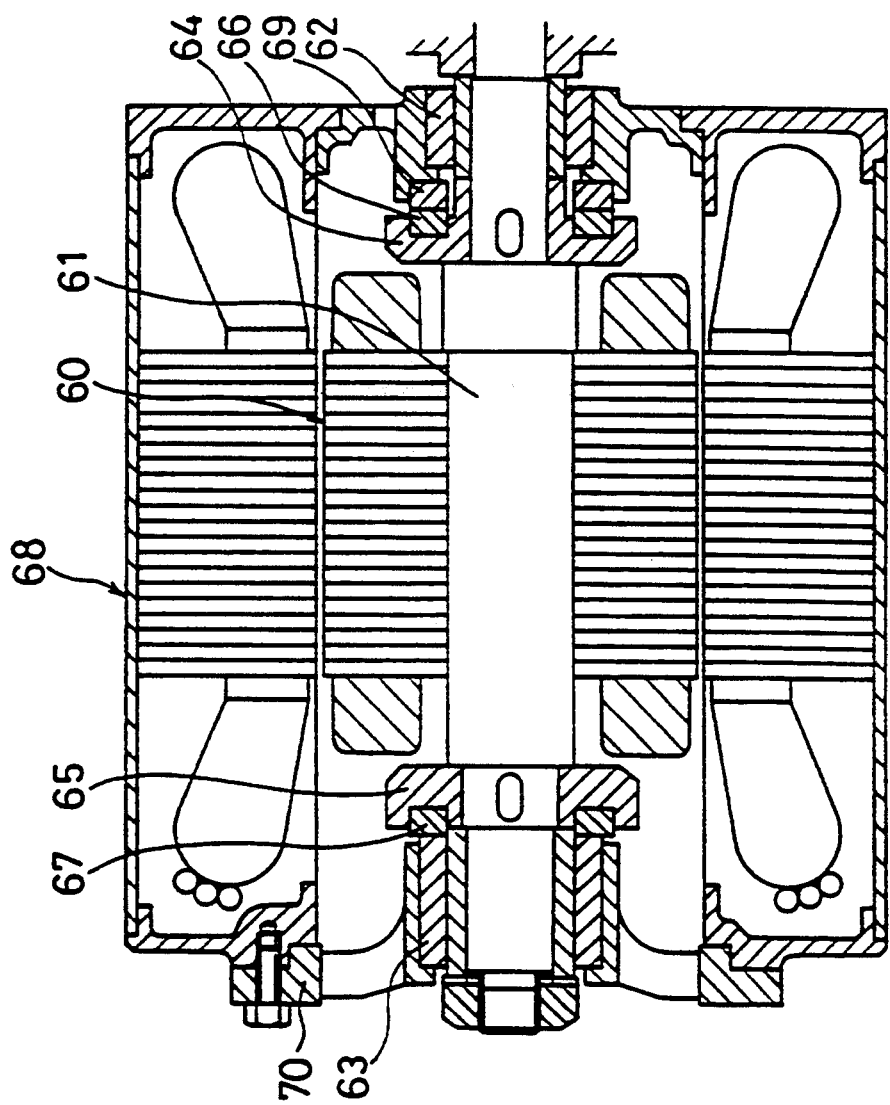
FIG. 12 is an axial cross-sectional view of a canned motor incorporating a conventional bearing device.
Figure 13A:
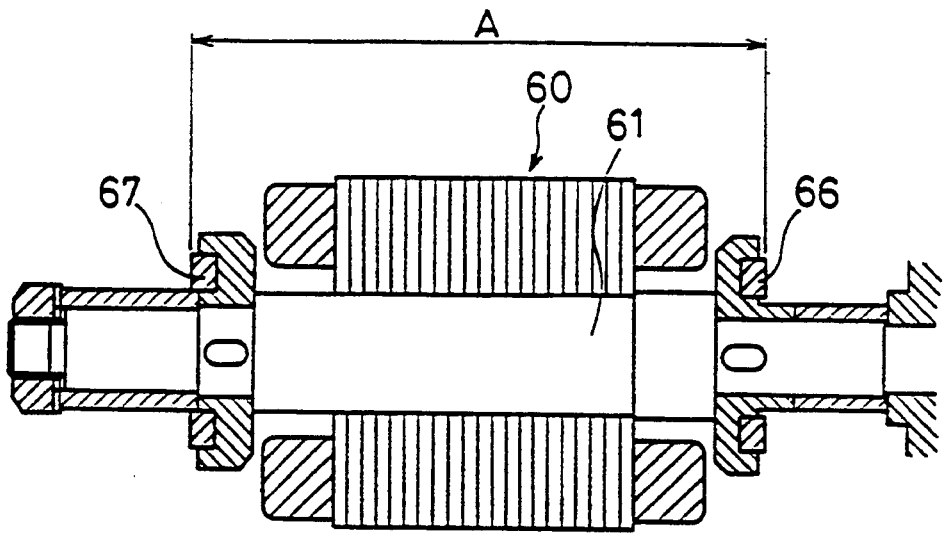
FIG. 13(a) is an axial cross-sectional view of parts of the conventional bearing device which are mounted on a motor rotor.
Figure 13B:
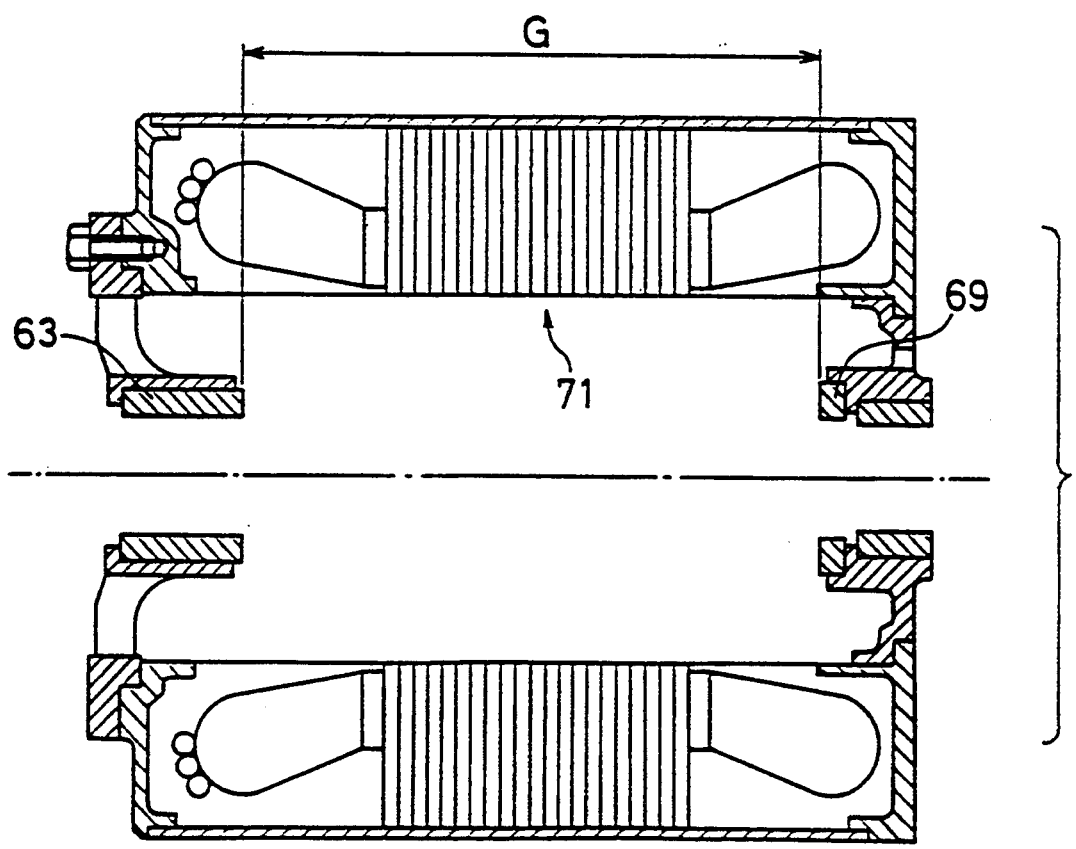
FIG. 13(b) is an axial cross-sectional view of parts of the conventional bearing device which are mounted on a motor stator.

Next, a thrust bearing device shown in FIGS. 1 and 5, with a mechanism for preventing the thrust bearing from rotating will be described in detail with reference to FIGS. 10 and 11.

The stationary thrust bearing 34 and the rotating thrust bearing 39 are made of ceramics and in the form of thin plates. The thrust bearings 34, 39 have sliding surfaces 34a, 39a and backsides 34b, 39b, respectively. Recesses 34c, 39c are formed on the backsides 34b, 39b of the thrust bearings 34, 39, respectively.

The bearing housing 32 and the thrust disk 37 have respective resilient pins 58, 59 horizontally provided thereon. The pin 58 is engaged with the recess 34c to prevent the thrust bearing 34 from rotating, and the pin 59 is engaged with the recess 39c to rotate the thrust bearing 39 together with the thrust disk 37. Incidentally, the recesses 34c, 39c may be formed on inner circumferential edges of the thrust bearings 34, 39 as shown by the broken line in FIG. 11(b).

According to the above thrust bearing device, since the pins 58, 59 engage the recesses 34c, 39c, respectively, impulse force applied to the thrust bearings 34, 39 at the time of starting rotation of the main shaft 16 can be absorbed by the resiliency of the pins to thus protect the ceramic thrust bearings 34, 39 which are weak against impulse forces.

Since the pins 58, 59 are made of resilient material, dimensional accuracy of the thrust bearings 34, 39 is not required, and machining of the thrust bearings 34, 39 is not required after sintering.

Although certain preferred embodiments of the present invention have been shown and described in detail, it should be understood that various changes and modifications may be made therein without departing from the scope of the appended claims.

What is claimed is:

1. A cartridge type bearing device in a canned motor having a motor frame and a rotor rotatable with respect to the motor frame, the rotor having a shaft, said cartridge type bearing device being capable of receiving bidirectional thrust forces and comprising:

a bearing housing detachably mounted on said motor frame;

a radial bearing supported by said bearing housing, said shaft being rotatably supported by said radial bearing;

a pair of axially spaced stationary thrust sliding surfaces on said bearing housing;

a pair of axially spaced rotating thrust sliding surfaces on said rotor in confronting relationship to said stationary thrust sliding surfaces, respectively; and a resilient member interposed between said motor frame and said bearing housing for resiliently holding said bearing housing in radial position with respect to said motor frame, said bearing housing and said stationary and rotary thrust surfaces comprising a cartridge for receiving bidirectional thrust.

2. The bearing device according to claim 1, wherein said canned motor has a cylindrical can mounted in said motor frame, said bearing housing having an outside diameter greater than an inside diameter of said can.

3. The bearing device according to claim 1, wherein said resilient member comprises an O-ring.

4. The bearing device according to claim 1, further comprising holding means for holding said bearing housing in position against removal in an axial direction of said rotor.

5. The bearing device according to claim 4, wherein said holding means comprises said resilient member in the form of an O-ring which is provided in a groove formed on said bearing housing and a groove formed on said motor frame.

6. The bearing device according to claim 4, wherein said holding means comprises a holder plate provided on said motor frame.

7. The bearing device according to claim 1, further comprising a second bearing housing and a second resilient member interposed in an axial gap between said motor frame and said second bearing housing.

8. The bearing device according to claim 1, wherein one of said stationary thrust sliding surfaces is formed on a thrust bearing supported by said bearing housing.

9. The bearing device according to claim 8, further comprising a resilient pin interposed between said bearing housing and said thrust bearing so that said thrust bearing is prevented from rotating with respect to said bearing housing.

10. The bearing device according to claim 1, wherein one of said rotating thrust sliding surfaces is formed on a thrust bearing supported by a thrust disk fixed to said shaft.

11. The bearing device according to claim 10, further comprising a resilient pin interposed between said thrust disk and said thrust bearing so that said thrust bearing is prevented from rotating with respect to said thrust disk.

12. A canned motor having a cartridge type bearing device being capable of receiving bidirectional thrust forces, comprising:

a motor frame housing a stator;

a rotor rotatably supported by said motor frame and including a shaft having a pair of axially opposite end portions; and a cartridge type bearing device disposed on one of said axially opposite end portions of said shaft, said cartridge type bearing device comprising:

a bearing housing detachably mounted on said motor frame;

a radial bearing supported by said bearing housing, said shaft being rotatably supported by said radial bearing;

a pair of axially spaced stationary thrust sliding surfaces on said bearing housing;

a pair of axially spaced rotating thrust sliding surfaces on said rotor in confronting relationship to said stationary thrust sliding surfaces, respectively; and a resilient member interposed between said motor frame and said bearing housing for resiliently holding said bearing housing in a radial position with respect to said motor frame;

said bearing housing and said stationary and rotary thrust surfaces comprising a cartridge for receiving bidirectional thrust.

13. The canned motor according to claim 12, wherein said canned motor has a cylindrical can mounted in said motor frame, said bearing housing having an outside diameter greater than an inside diameter of said can.

14. The canned motor according to claim 12, wherein said resilient member comprises an O-ring.

15. The canned motor according to claim 12, further comprising holding means for holding said bearing housing in position against removal in an axial direction of said rotor.

16. The canned motor according to claim 15, wherein said holding means comprises said resilient member in the form of an O-ring which is provided in a groove formed on said bearing housing and a groove formed on said motor frame.

17. The canned motor according to claim 15, wherein said holding means comprises a holder plate provided on said motor frame.

18. The canned motor according to claim 12, further comprising a second bearing housing and a second resilient member interposed in an axial gap between said motor frame and said second bearing housing.

19. The canned motor according to claim 12, further comprising a second bearing device disposed on the other of said axially opposite end portions of said shaft, said second bearing device comprising:

a second bearing housing detachably mounted on said motor frame;

a second radial bearing supported by said second bearing housing, said shaft being rotatably supported by said second radial bearing; and a second resilient member interposed between said motor frame and said second bearing housing for holding said second bearing housing in radial position with respect to said motor frame.

20. The canned motor according to claim 19, further comprising holding means for holding said bearing housing in position against removal in an axial direction of said rotor.

21. The canned motor according to claim 20, wherein said holding means comprises an O-ring which is provided in a groove formed on said bearing housing and a groove formed on said motor frame.

22. The canned motor according to claim 19, wherein said second resilient member comprises an O-ring.

23. The canned motor according to claim 19, further comprising a collar provided on said shaft for holding said second bearing housing in position against removal in an axial direction of said rotor.

24. A full-circumferential flow in-line pump having a cartridge type bearing device being capable of receiving bidirectional thrust forces, comprising:

a pump casing;

a canned motor in said pump casing, said canned motor comprising:

motor frame housing a stator;

a rotor rotatably supported by said motor frame and including a shaft having a pair of axially opposite end portions; and a cartridge type bearing device disposed on one of said axially opposite end portions of said shaft, said cartridge type bearing device comprising:

a bearing housing detachably mounted on said motor frame;

a radial bearing supported by said bearing housing, said shaft being rotatably supported by said radial bearing;

a pair of axially spaced stationary thrust sliding surfaces on said bearing housing;

a pair of axially spaced rotating thrust sliding surfaces on said rotor in confronting relationship to said stationary thrust sliding surfaces, respectively; and a resilient member interposed between said motor frame and said bearing housing for resiliently holding said bearing housing in radial position with respect to said motor frame, said bearing housing and said stationary and rotary thrust surfaces comprising a cartridge for receiving bidirectional thrust.

25. The full-circumferential flow in-line pump according to claim 24, further comprising a holder plate having a guide surface projecting toward a discharge port of said pump casing so as to guide fluid toward said discharge port, wherein said guide surface has a plurality of slits extending from a radially outward edge to a radially inward edge so that fluid is introduced to said canned motor.

26. The full-circumferential flow in-line pump according to claim 24, further comprising a holder plate provided on one of said motor frame and said pump casing for holding said bearing housing in position against removal in an axial direction of said rotor.

* * * * *